(12) United States Patent
Kirchhof et al.

(10) Patent No.: US 9,759,331 B2
(45) Date of Patent: *Sep. 12, 2017

(54) MECHANICAL FACE SEAL WITH A ROTATING COUNTER RING AND PRECISELY DEFINED CLAMPING

(75) Inventors: Martin Kirchhof, Miesbach (DE); Armin Laxander, Ebenhausen (DE); Guenther Lederer, Geretsried (DE); Thomas Keller, Geretsried (DE)

(73) Assignee: CARL FREUDENBERG KG, Weinheim (DE)

( * ) Notice: Subject to any disclaimer, the term of this patent is extended or adjusted under 35 U.S.C. 154(b) by 76 days.

This patent is subject to a terminal disclaimer.

(21) Appl. No.: 13/642,860

(22) PCT Filed: Apr. 18, 2011

(86) PCT No.: PCT/EP2011/001955
§ 371 (c)(1),
(2), (4) Date: Oct. 23, 2012

(87) PCT Pub. No.: WO2011/131328
PCT Pub. Date: Oct. 27, 2011

(65) Prior Publication Data
US 2013/0038023 A1 Feb. 14, 2013

(30) Foreign Application Priority Data

Apr. 23, 2010 (DE) .................. 10 2010 018 307
Jun. 18, 2010 (DE) .................. 10 2010 024 291

(51) Int. Cl.
*F16J 15/34* (2006.01)

(52) U.S. Cl.
CPC ................ *F16J 15/3468* (2013.01)

(58) Field of Classification Search
CPC ...................................... F16J 15/3468
USPC ............... 277/370, 371, 375, 393, 397
See application file for complete search history.

(56) References Cited

U.S. PATENT DOCUMENTS

| 2,645,507 | A | * | 7/1953 | Isenbarger | ............... F16J 15/36 |
| | | | | | 277/373 |
| 2,884,267 | A | * | 4/1959 | Kosatka | ............... 277/372 |
| 3,416,154 | A | * | 12/1968 | Heller | ............... G11B 7/08 |
| | | | | | 156/293 |

(Continued)

FOREIGN PATENT DOCUMENTS

| CN | 1314978 A | 9/2001 |
| CN | 201059282 Y | 5/2008 |

(Continued)

OTHER PUBLICATIONS

European Patent Office, International Search Report in International Patent Appilcation No. PCT/EP2011/001955 (Sep. 8, 2011).

*Primary Examiner* — Kristina Fulton
*Assistant Examiner* — Thomas Neubauer
(74) *Attorney, Agent, or Firm* — Leydig, Voit & Mayer, Ltd.

(57) ABSTRACT

A mechanical face seal includes a rotating counter ring having a sealing surface and two radial planes. Each of the radial planes is associated with a clamping cam. A stationary face seal ring has a sealing surface opposite from the sealing surface of the counter ring. The sealing surfaces of the counter ring and the face seal ring bear against each other.

5 Claims, 2 Drawing Sheets

(56) References Cited

U.S. PATENT DOCUMENTS

| | | | |
|---|---|---|---|
| 4,272,084 A * | 6/1981 | Martinson et al. | 277/365 |
| 4,613,142 A * | 9/1986 | Heilala | F16J 15/3468 277/399 |
| 4,773,655 A * | 9/1988 | Lummila | F16J 15/3468 277/370 |
| 4,792,146 A * | 12/1988 | Lebeck et al. | 277/360 |
| 5,490,679 A * | 2/1996 | Borrino et al. | 277/369 |
| 5,501,471 A * | 3/1996 | Ohba | F16J 15/3464 277/379 |
| 5,626,347 A | 5/1997 | Ullah | |
| 6,213,472 B1 * | 4/2001 | Bondarenko et al. | 277/399 |
| 6,325,378 B1 * | 12/2001 | Okumachi et al. | 277/348 |
| 6,616,145 B2 * | 9/2003 | Schulten et al. | 277/360 |
| 6,916,022 B2 * | 7/2005 | Auber | 277/512 |
| 7,144,015 B2 * | 12/2006 | Roberts-Haritonov et al. | 277/361 |
| 7,311,307 B2 * | 12/2007 | Dahlheimer | 277/373 |
| 8,181,966 B2 * | 5/2012 | Haynes et al. | 277/371 |
| 2002/0096836 A1 | 7/2002 | Schulten et al. | |
| 2006/0022413 A1 * | 2/2006 | Zutz | F16J 15/348 277/370 |
| 2007/0069476 A1 * | 3/2007 | Dahlheimer | 277/370 |

FOREIGN PATENT DOCUMENTS

| | | |
|---|---|---|
| DE | 107762 A1 | 8/1974 |
| DE | 20019881 U1 | 4/2001 |
| DE | 102006028153 A1 | 2/2008 |
| EP | 0265147 A2 | 4/1988 |
| EP | 0591586 A1 | 4/1994 |
| EP | 1209386 A1 | 5/2002 |
| JP | 6173875 U | 5/1986 |
| JP | 4134963 B2 | 8/2008 |
| JP | 2009501302 A | 1/2009 |
| SU | 649916 A1 | 2/1979 |

* cited by examiner

MECHANICAL FACE SEAL WITH A ROTATING COUNTER RING AND PRECISELY DEFINED CLAMPING

CROSS-REFERENCE TO PRIOR APPLICATIONS

This application is a U.S. National Phase application under 35 U.S.C. §371 of International Application No. PCT/EP2011/001955, filed on Apr. 18, 2011, and claims benefit to German Patent Application Nos. DE 10 2010 018 307.5, filed on Apr. 23, 2010, and DE 10 2010 024 291.8, filed on Jun. 18, 2010. The International Application was published in German on Oct. 27, 2011, as WO 2011/131328 under PCT Article 21(2).

FIELD

The invention relates to a mechanical face seal, comprising a rotating counter ring and a stationary face seal ring, whereby the counter ring and the face seal ring have sealing surfaces that bear against each other, and whereby the sealing surface of the counter ring is situated opposite from the sealing surface of the face seal ring.

BACKGROUND

Mechanical face seals are described in European patent application EP 1 209 386 A1.

A counter ring can rotate with respect to the mean sliding surface diameter at sliding speeds of up to 200 m/s relative to the stationary face seal ring. At high sliding speeds, viscous friction in the sealing gap leads to a considerable heat input into the face seal ring and into the counter ring. Axial temperature gradients in the face seal ring and in the counter ring can cause severe deformation of the rings. The geometry of the sealing gap can change in an undesired or impermissible manner, specifically, in terms of the height of the sealing gap as well as its V-shaped widening.

European patent application EP 1 209 386 A1 describes to non-rotatably clamp a rotating counter ring onto a shaft by means of a bushing and a clamping element.

SUMMARY

In an embodiment, the present invention provides a mechanical face seal. A rotating counter ring has a sealing surface and two radial planes. Each of the radial planes is associated with a clamping cam. A stationary face seal ring has a sealing surface opposite from the sealing surface of the counter ring. The sealing surfaces of the counter ring and the face seal ring bear against each other.

BRIEF DESCRIPTION OF THE DRAWINGS

The present invention will be described in even greater detail below based on the exemplary figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
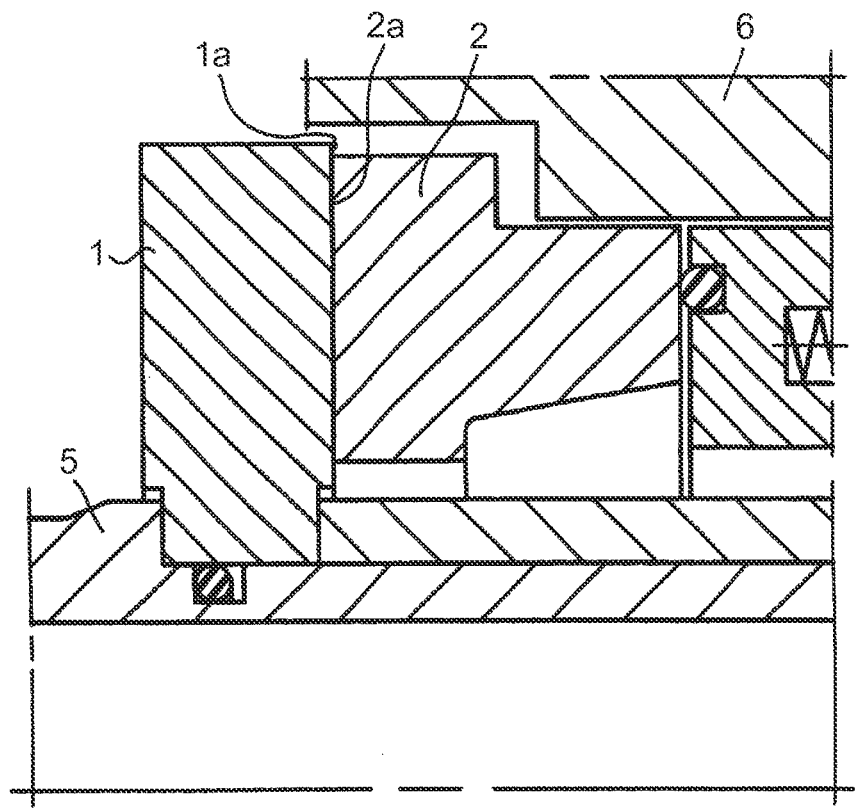
FIG. 1 shows a sectional view of a mechanical face seal of the state of the art, in which the rotating counter ring does not have a clamping cam in the axial direction.

The present invention recognizes a drawback of the prior-art mechanical face seals is that the rotating counter ring can execute undesired tilting motions during the rotation. This can result in undesired changes in the geometry of the sealing gap between the sealing surfaces. Then the mechanical face seal can no longer ensure a reliable function during all of the operating states that occur.

However, very high requirements are made of the function and operational reliability of mechanical face seals, in particular, when they are used in turbo machines such as, for example, compressors or gas turbines, where operating conditions that vary widely occur in terms of pressure, speed and temperature.

Therefore, according to an embodiment, the invention provides and refines a mechanical face seal in such a way that it ensures a dependable function and operational reliability, even at varying and different speeds, pressures and temperatures.

According to an embodiment, the mechanical face seal is characterized in that the counter ring has two radial planes, each of which is associated with a clamping cam.

According to an embodiment of the invention, it has been recognized that axially projecting clamping cams can ensure a defined clamping of the counter ring. Any tilting moments that occur can be compensated for and avoided surprisingly easily. Here, it has been recognized that a counter ring clamped between clamping elements can undergo frictional contact with said elements. In this process, frictional forces occur that bring about tilting moments. It was then recognized that clamping cams can be arranged in such a way that the occurring tilting moments compensate for each other. Here, it was concretely recognized that the clamping cams define a plane on which the tilting moments can act in a defined manner that can be compensated for. Therefore, the counter ring surprisingly displays a high degree of stability regarding its tilting behavior, even in case of widely varying stresses in terms of pressure, speed and temperature. As a result, an optimal geometry of the sealing gap is maintained, even under operating conditions that vary widely.

The concept of associating the clamping cams with the radial planes refers either to the formation of the clamping cams directly on the counter ring or else on the clamping elements of the shaft.

Consequently, the above-mentioned objective is achieved.

The counter ring could have two radial planes from each of which a clamping cam projects in the axial direction. Advantageously, the clamping cams are configured on the counter ring and not on the bushing and on the clamping element. This has to do with the fact that the material used for the counter ring is softer than the materials used for the bushing and for the clamping element. Moreover, an effort is made to achieve uniform wear of the clamping cams.

The clamping cams could be configured to be annular and concentric with respect to the counter ring. In this manner, the counter ring can be anchored on the shaft by means of line pressure.

The clamping cams could be formed from the counter ring and configured in one piece with it.

The clamping cams could be configured at the same height on both sides of the counter ring in the radial direction. This ensures that tilting moments that occur are exerted on the same plane and can advantageously compensate for each other.

Tilting moments occur as soon as the counter ring and the shaft move radially relative to each other. These tilting moments are compensated for in that the clamping cams are arranged at the same radial height.

One arrangement could have a mechanical face seal of the type described here as well as and a shaft, whereby the counter ring is non-rotatably joined to the shaft by means of a clamping element and a bushing, and whereby a first clamping cam bears against the bushing while the second clamping cam bears against the clamping element. Due to the bushing and the clamping element, the counter ring can be clamped onto the shaft in a defined manner.

The mechanical face seal described here is especially well-suited for use in turbo machines such as, for example, compressors or gas turbines, since such a seal ensures a reliable function, even at varying and different speeds, pressures and temperatures.

The mechanical face seal described here seals a gas or a mixture of a gas and a liquid, whereby the sealing surfaces are gas-lubricated.

There are various possibilities for configuring and refining the teaching of the present invention in an advantageous manner. For this purpose, on the one hand, reference is hereby made to the following claims and, on the other hand, to the explanation below of a preferred embodiment of the mechanical face seal according to the invention on the basis of the drawing.

Generally preferred embodiments and refinements of the teaching are explained in conjunction with the explanation of the preferred embodiment.

FIG. 1 shows a mechanical face seal of the state of the art.

The mechanical face seal shown in FIG. 1 comprises a rotating counter ring 1 and a stationary face seal ring 2, whereby the counter ring 1 and the face seal ring 2 have sealing surfaces 1a, 2a that bear against each other, whereby the sealing surface 1a of the counter ring 1 is opposite from the sealing surface 2a of the face seal ring 2.

The rotating counter ring 1 is permanently associated with a rotating shaft 5 and rotates along with it. The stationary face seal ring 2 is arranged in a housing 6 so as to be loosely centered.

Figure 2:
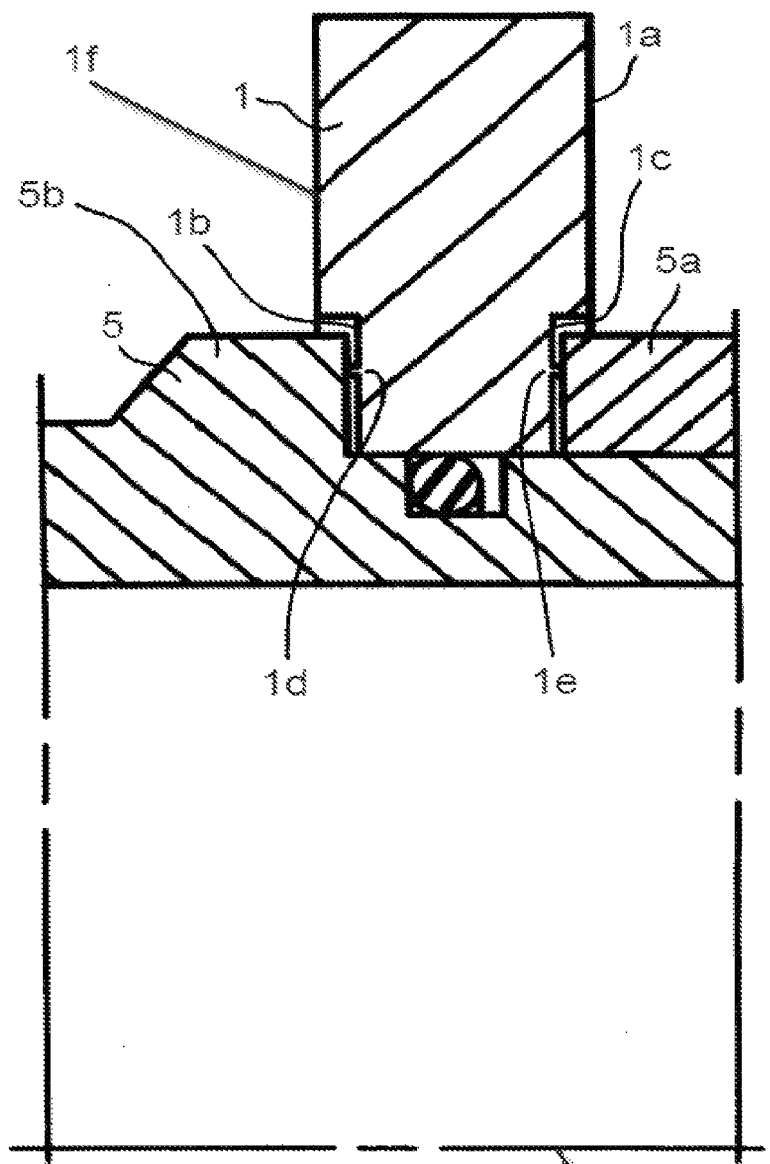
FIG. 2 shows a sectional view of a part of a mechanical face seal according to an embodiment of the invention on the shaft side, in which the counter ring has clamping cams projecting to both sides.

FIG. 2 shows the part of a mechanical face seal on the shaft side, whose structure is analogous to that of the mechanical face seal according to FIG. 1, comprising a rotating counter ring 1 and a stationary face seal ring 2, whereby the counter ring 1 and the stationary face seal ring 2 have sealing surfaces 1a, 2a that bear against each other, whereby the sealing surface 1a of the counter ring 1 is axially opposite from the sealing surface 2a of the face seal ring 2. An opposite radial surface if is disposed on the opposite side of the counter ring 1 relative to the sealing surface 2a. The counter ring 1 has two axially opposite radial planes 1b, 1c from each of which a clamping cam 1d, 1e projects in the axial direction. The clamping cams 1d, 1e project from the counter ring 1 to both sides.

The clamping cams 1d, 1e are configured to be annular and concentric with respect to the counter ring 1. However, they can also be configured only partially on the radial planes 1b, 1c.

The radial planes 1b, 1c are offset axially inwards with respect to the sealing surface 1a as well as with respect to the radial plane opposite from the sealing surface 1a.

The clamping cams 1d, 1e are configured on both sides of the counter ring 1 in the radial direction at the same height relative to the axis of rotation of the shaft 5.

Concretely, FIG. 2 shows the part of an arrangement on the shaft side, comprising a mechanical face seal of the type described above and a rotating shaft 5, whereby the counter ring 1 is non-rotatably joined to the shaft 5 by means of a clamping element 5a and a bushing 5b, and whereby a first clamping cam 1d bears against the bushing 5b, while the second clamping cam 1e bears against the clamping element 5a. The rotating shaft 5 rotates about the shaft axis 7.

Advantageously, the clamping cams 1d, 1e are configured on the counter ring 1 and not on the bushing 5b and on the clamping element 5a. This has to do with the fact that the material used for the counter ring 1 is softer than the materials used for the bushing 5b or for the clamping element 5a. Moreover, an effort is made to achieve uniform wear of the clamping cams 1d, 1e.

The counter ring 1 is made of metal and has a diameter (inner dimension) of 300 mm.

The face seal ring 2 is made of a carbon material.

Regarding other advantageous embodiments and refinements of the teaching according to the invention, reference is made to the general part of the description on the one hand, and to the accompanying patent claims on the other hand.

The invention claimed is:

1. A mechanical face seal, comprising:
   a counter ring rotating about an axis, the counter ring having a sealing surface and two planar surfaces facing in opposite directions of the axis, the two planar surfaces being offset axially inward relative to the sealing surface, wherein each of the two planar surfaces is associated with a respective clamping cam, the clamping cams projecting in opposite directions of the axis; and
   a stationary face seal ring having a sealing surface opposite from the sealing surface of the counter ring, the sealing surfaces of the counter ring and the face seal ring bearing against each other.

2. The mechanical face seal according to claim 1, wherein each of the clamping cams projects from a respective one of the radial planes in an axial direction.

3. The mechanical face seal according to claim 1, wherein the clamping cams are annular and concentric with respect to the counter ring.

4. The mechanical face seal according to claim 1, wherein the clamping cams have a same height on each side of the counter ring in a radial direction.

5. An arrangement, comprising:
   a mechanical face seal, comprising:
   a counter ring rotating about an axis, the counter ring having a sealing surface and two planar surfaces facing in opposite directions of the axis, the two planar surfaces being offset axially inward relative to the sealing surface, wherein each of the two planar surfaces is associated with a respective clamping cam, the clamping cams projecting in opposite directions of the axis; and
   a stationary face seal ring having a sealing surface opposite from the sealing surface of the counter ring, the sealing surfaces of the counter ring and the face seal ring bearing against each other; and
   a shaft, the counter ring being non-rotatably joined to the shaft via a clamping element and a bushing with the two planar surfaces of the counter ring being disposed between the clamping element and the bushing, a first one of the clamping cams bearing against the bushing and a second one of the clamping cams bearing against the clamping element.

* * * * *